US007997639B2

(12) United States Patent
Yokomori et al.

(10) Patent No.: US 7,997,639 B2
(45) Date of Patent: Aug. 16, 2011

(54) SLIDE DOOR OPENING/CLOSING DEVICE OF MOTOR VEHICLE

(75) Inventors: Kazuhito Yokomori, Yokohama (JP); Tomoya Yamaguchi, Yokohama (JP)

(73) Assignee: Mitsui Kinzoku Act Corporation, Yokohama-shi (JP)

( * ) Notice: Subject to any disclaimer, the term of this patent is extended or adjusted under 35 U.S.C. 154(b) by 315 days.

(21) Appl. No.: 12/236,827

(22) Filed: Sep. 24, 2008

(65) Prior Publication Data

US 2009/0113801 A1 May 7, 2009

(30) Foreign Application Priority Data

Nov. 7, 2007 (JP) ................................ 2007-289583

(51) Int. Cl.
*B60J 5/08* (2006.01)

(52) U.S. Cl. ...................... 296/155; 296/154; 296/146.4

(58) Field of Classification Search .................. 296/154, 296/146.4, 146.8, 146.9, 193.07, 193.05, 296/203.03, 155; 49/348, 360
See application file for complete search history.

(56) References Cited

U.S. PATENT DOCUMENTS 6,435,600 B1 * 8/2002 Long et al. .................... 296/155
7,144,068 B2 * 12/2006 Oxley et al. .................. 296/155
7,159,930 B2 * 1/2007 Yokomori et al. ............ 296/155
7,325,361 B2 * 2/2008 Rogers et al. ................... 49/360
7,347,025 B2 * 3/2008 Fukumoto et al. .............. 49/360
7,354,100 B2 * 4/2008 Yokomori et al. ............ 296/155
7,585,014 B2 * 9/2009 Nishimura et al. ........... 296/155
7,641,260 B2 * 1/2010 Ide ................................ 296/155
7,648,194 B2 * 1/2010 Hirasawa et al. ........ 296/203.03
7,770,961 B2 * 8/2010 Oxley .......................... 296/155
2006/0113821 A1 * 6/2006 Yokomori et al. ............ 296/155
2009/0113801 A1 * 5/2009 Yokomori et al. .............. 49/352

FOREIGN PATENT DOCUMENTS

JP 5-36058 Y2 9/1993

* cited by examiner

*Primary Examiner* — Glenn Dayoan
*Assistant Examiner* — Gregory Blankenship
(74) *Attorney, Agent, or Firm* — Foley & Lardner LLP

(57) ABSTRACT

A lower guide rail is mounted to a lower surface of a vehicle floor panel. Front and rear cable guides are provided on front and rear ends of the lower guide rail. A lower roller bracket fixed to a slide door is guided by the lower guide rail. An electric actuator unit is mounted to the lower surface of the floor panel. The electric actuator unit includes a cable wind/rewind drum. A watertight cover is mounted to the lower surface of the floor panel in a manner to cover the electric actuator unit. A first inner cable is guided by the front cable guide and has one end portion wound on the wind/rewind drum and the other end fixed to the lower roller bracket. A second inner cable is guided by the rear cable guide and has one end portion wound on the wind/rewind drum and the other end fixed to the lower roller bracket.

18 Claims, 12 Drawing Sheets

SLIDE DOOR OPENING/CLOSING DEVICE OF MOTOR VEHICLE

BACKGROUND OF THE INVENTION

1. Field of the Invention

The present invention relates to slide door opening/closing devices of a motor vehicle, and more particularly to the slide door opening/closing devices of a type that opens/closes a slide door with the aid of power produced by an electric actuator mounted to a lower part of a vehicle floor. More specifically, the present invention is concerned with the slide door opening/closing devices of a type that exhibits an excellent waterproof performance for the electric actuator.

2. Description of the Related Art

One of the slide door opening/closing devices of the above-mentioned type is disclosed in Japanese Laid-open Utility Model Application (Jikkohei) 5-36058, which generally comprises a guide rail and an electric actuator that are mounted to a lower part of a vehicle floor, a roller bracket that is fixed to a slide door and slidably guided by the guide rail, and a cable that extends along the guide rail. The cable is fixed to the roller bracket and put around a drum of the electric actuator, so that upon energization of the electric actuator, the door is moved in one or other direction along the guide rail through the cable and roller bracket. That is, opening/closing of the slide door is controlled by changing the direction of rotation of the drum, that is, by changing the direction of current fed to the electric actuator.

SUMMARY OF THE INVENTION

Due to its inherent construction, the above-mentioned slide door opening/closing device needs to provide the vehicle floor with an elongate groove along the guide rail for allowing movement of a connected potion of the roller bracket with the cable therein and therealong. However, such elongate groove tends to collect therein rain water or the like which may damage the electric actuator. Even when the electric actuator is surrounded by watertight panels, the possibility of damaging the electric actuator is not completely eliminated so long as the groove is present on the vehicle floor.

Accordingly, an object of the present invention is to provide a slide door opening/closing device of a motor vehicle, which is free of the above-mentioned drawback.

It is an object of the present invention to provide a slide door opening/closing device which exhibits an excellent waterproof performance for an electric actuator.

In accordance with a first aspect of the present invention, there is provided a slide door opening/closing device of a motor vehicle, which comprises a lower guide rail mounted to a lower surface of a vehicle floor panel; a lower roller bracket fixed to a slide door, the lower roller bracket being guided by the lower guide rail when the slide door is moved between open and closed positions; an electric actuator unit mounted to the lower surface of the floor panel; a watertight cover mounted to the lower surface of the floor panel in a manner to cover the electric actuator unit separating a space wherein the lower guide rail is present from a space wherein the electric actuator unit is present; cables passing through cable passing openings formed in the watertight cover and running in the lower guide rail, the cables being driven by the electric actuator unit and having respective ends fixed to the lower roller bracket, so that upon energization of the electric actuator unit, the lower roller bracket is moved for the movement of the slide door between the open and closed positions; and sealing members that hermetically close the cable passing openings.

In accordance with a second aspect of the present invention, there is provided a slide door opening/closing device of a motor vehicle, which comprises a lower guide rail mounted to a lower surface of a vehicle floor panel; front and rear cable guides provided on front and rear ends of the lower guide rail; a lower roller bracket fixed to a slide door, the lower roller bracket being guided by the lower guide rail when the slide door is moved between open and closed positions; an electric actuator unit mounted to the lower surface of the floor panel, the electric actuator unit including a cable wind/rewind drum; a watertight cover mounted to the lower surface of the floor panel in a manner to cover the electric actuator unit, the watertight cover having front and rear cable passing openings formed therethrough; a first inner cable that passes through the front cable passing opening and is guided by the front cable guide, the first inner cable having one end portion wound on the wind/rewind drum and the other end fixed to the lower roller bracket; a second inner cable that passes through the rear cable passing opening and is guided by the rear cable guide, the second inner cable having one end portion wound on the wind/rewind drum and the other end fixed to the lower roller bracket; and sealing members that hermetically close the front and rear cable passing openings.

In accordance with a third aspect of the present invention, there is provided a slide door opening/closing device of a motor vehicle, which comprises a lower guide rail mounted to a lower surface of a vehicle floor panel, the lower guide rail including a horizontal guide channel portion and a vertical guide channel portion; front and rear cable guides provided on front and rear end portions of the lower guide rail; a lower roller bracket fixed to a slide door, the lower roller bracket having a horizontal roller operatively received in the horizontal guide channel portion and a vertical roller operatively received in the vertical guide channel portion; an electric actuator unit mounted to the lower surface of the floor panel, the electric actuator unit including a cable wind/rewind drum; a watertight cover mounted to the lower surface of the floor panel in a manner to cover the electric actuator unit, the watertight cover having front and rear cable passing openings formed therethrough; a first inner cable that passes through the front cable passing opening and is guided by the front cable guide, the first inner cable having one end portion wound on the wind/rewind drum and the other end fixed to the lower roller bracket; a second inner cable that passes through the rear cable passing opening and is guided by the rear cable guide, the second inner cable having one end portion wound on the wind/rewind drum and the other end fixed to the lower roller bracket; and sealing members that hermetically close the front and rear cable passing openings.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, the present invention will be described in detail with reference to the accompanying drawings.

For ease of understanding, various directional terms, such as, right, left, upper, lower, rightward and the like are used in the following description. However, such terms are to be understood with respect to only a drawing or drawings on which a corresponding part or portion is shown.

Referring to FIGS. 1 to 11 of the drawings, there is shown a first embodiment of the slide door opening/closing device of the present invention.

Figure 1:
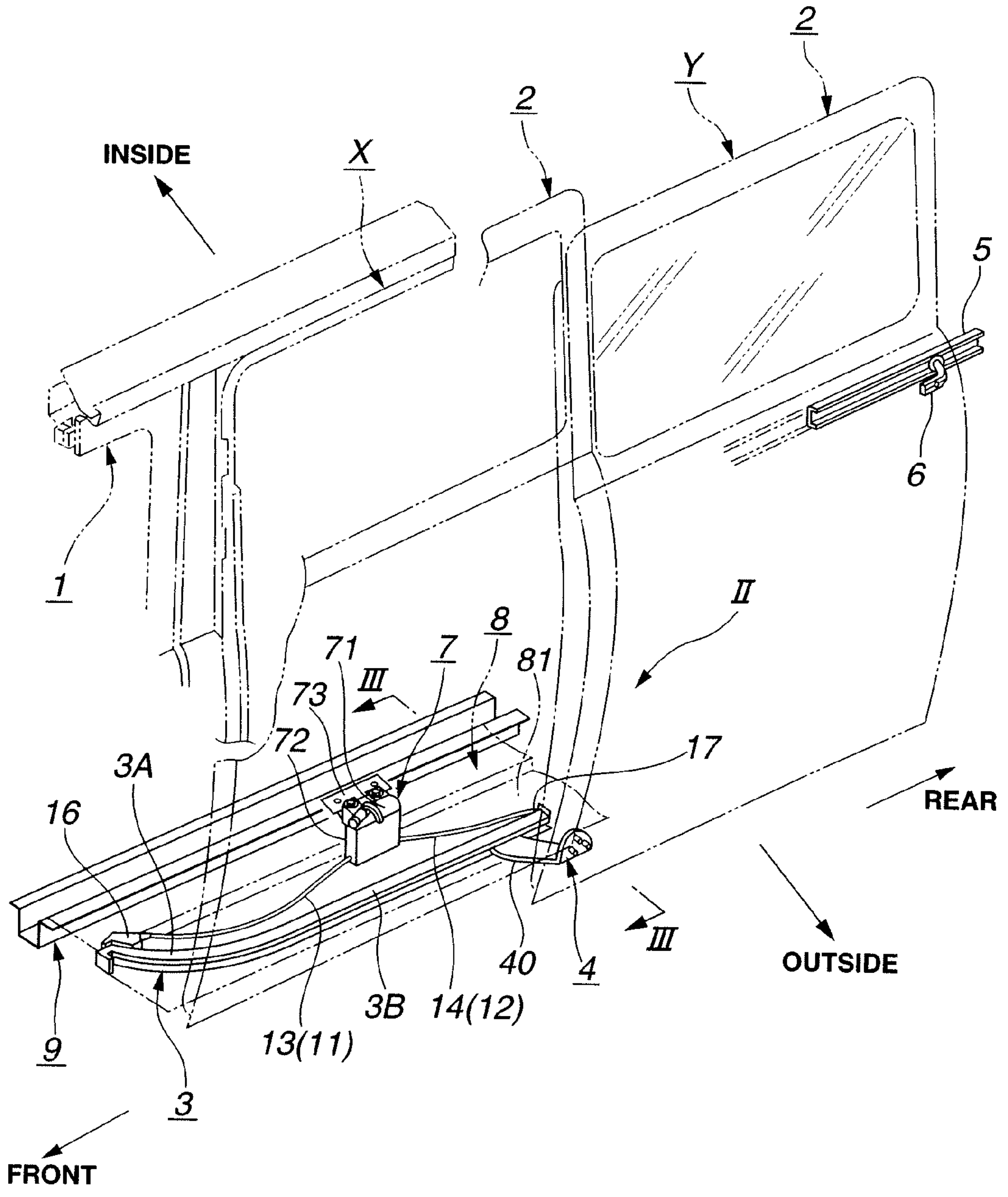
FIG. 1 is a schematically illustrated perspective view of a side door mounted portion of a motor vehicle, to which a slide door opening/closing device of a first embodiment of the present invention is practically applied.

In FIG. 1, there is shown a side part of a van type motor vehicle 1. In the drawing, the motor vehicle 1 has a front end at a left side and a rear end at a right side.

As shown, the motor vehicle has a vehicle body 1 and a slide side door 2. The slide side door 2 is constructed and arranged to slide forward (leftward in the drawing) and rearward (rightward in the drawing) to close and open a door opening formed in a side wall of the vehicle body 1.

The vehicle body 1 has a floor panel 8 that extends horizontally between front and rear ends of a vehicle cabin. The floor panel 8 has, at one side thereof facing the door opening, a step area 81.

Figure 3:
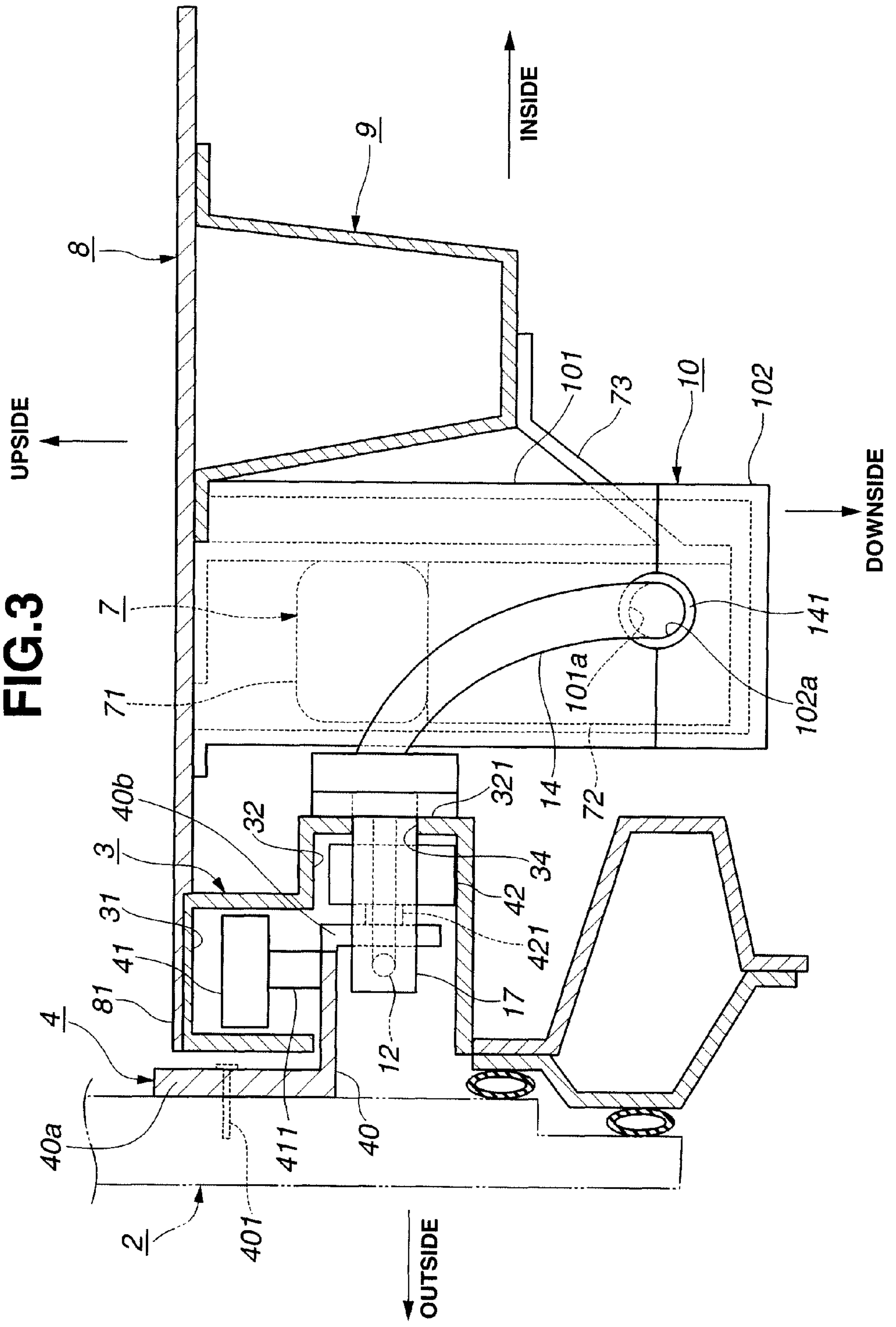
FIG. 3 is a schematically illustrated enlarged sectional view taken along the line "III-III" of FIG. 1.

As will be seen from FIGS. 1 and 3, on a lower surface of the step area 81 of the floor panel 8, there is mounted an elongate lower guide rail 3 that extends in a fore-and-aft direction and has an inwardly curved front portion (see FIG. 1).

The lower guide rail 3 is of a channel member and as is seen from FIG. 3, the lower guide rail 3 has a complicated cross section which will be described in detail hereinafter.

As is seen from FIGS. 1 and 3, on the lower surface of the floor panel 8 at a position inside the lower guide rail 3, there is mounted an elongate reinforcing side frame 9 that extends in parallel with a major part of the above-mentioned lower guide rail 3. The side frame 9 has a generally U-shaped cross section and comprises mutually inclined side walls (no numerals) whose respective foot portions are secured to the lower surface of the floor panel 8. Due to provision of the side frame 9, the floor panel 8 is reinforced.

As will be described in detail hereinafter, a lower roller bracket 4 fixed to a lower inside wall of the slide side door 2 projects into an interior of the lower guide rail 3 to be slidably engaged with the same.

As is seen from FIG. 1, to a rear portion of the side wall part of the vehicle body 1, there is fixed a waist guide rail 5 that extends in the fore-and-aft direction. The waist guide rail 5 is of a channel member. Slidably engaged with the waist guide rail 5 is a waist roller bracket 6 that is fixed to a waist portion of a rear part of the slide side door 2.

For moving the slide side door 2 with electric power, there is provided an electric actuator unit 7 that is mounted on the lower surface of the floor panel 8 at a position between the lower guide rail 3 and the side frame 9. Usually, the place between the lower guide rail 3 and the side frame 9 or a corresponding place is a so-called unassigned place. Thus, placing such electric actuator unit 7 on such position brings about effective usage of such place of the vehicle body 1. That is, in the present invention, there is no need of providing the vehicle body 1 with a space specifically for mounting therein the electric actuator unit 7, which is especially suitable for a small-sized motor vehicle.

Although not shown in the drawings, an upper guide rail is secured to an upper portion of the side wall part of the vehicle body 1, which extends in the fore-and-aft direction. An upper roller bracket (not shown) fixed to an upper front part of the slide side door 2 is slidably guided by the fixed upper guide rail.

Thus, under forward and rearward movement of the slide side door 2, the lower roller bracket 4, waist roller bracket 6 and upper roller bracket, which are all fixed to the slide side door 2, are guided by the lower guide rail 3, waist guide rail 5 and the upper guide rail respectively.

That is, as is seen from FIG. 1, when the electric actuator unit 7 is energized to move the slide side door 2 from a fully closed position "X", the door 2 is slightly shifted laterally outward at first and then moved rearward toward a fully open position "Y". While, when, with the slide side door 2 kept in the fully open position "Y", the electric actuator unit 7 is energized to close the door 2, the door 2 is moved forward and finally brought to the fully closed position "X" while curving inward.

Figure 4:
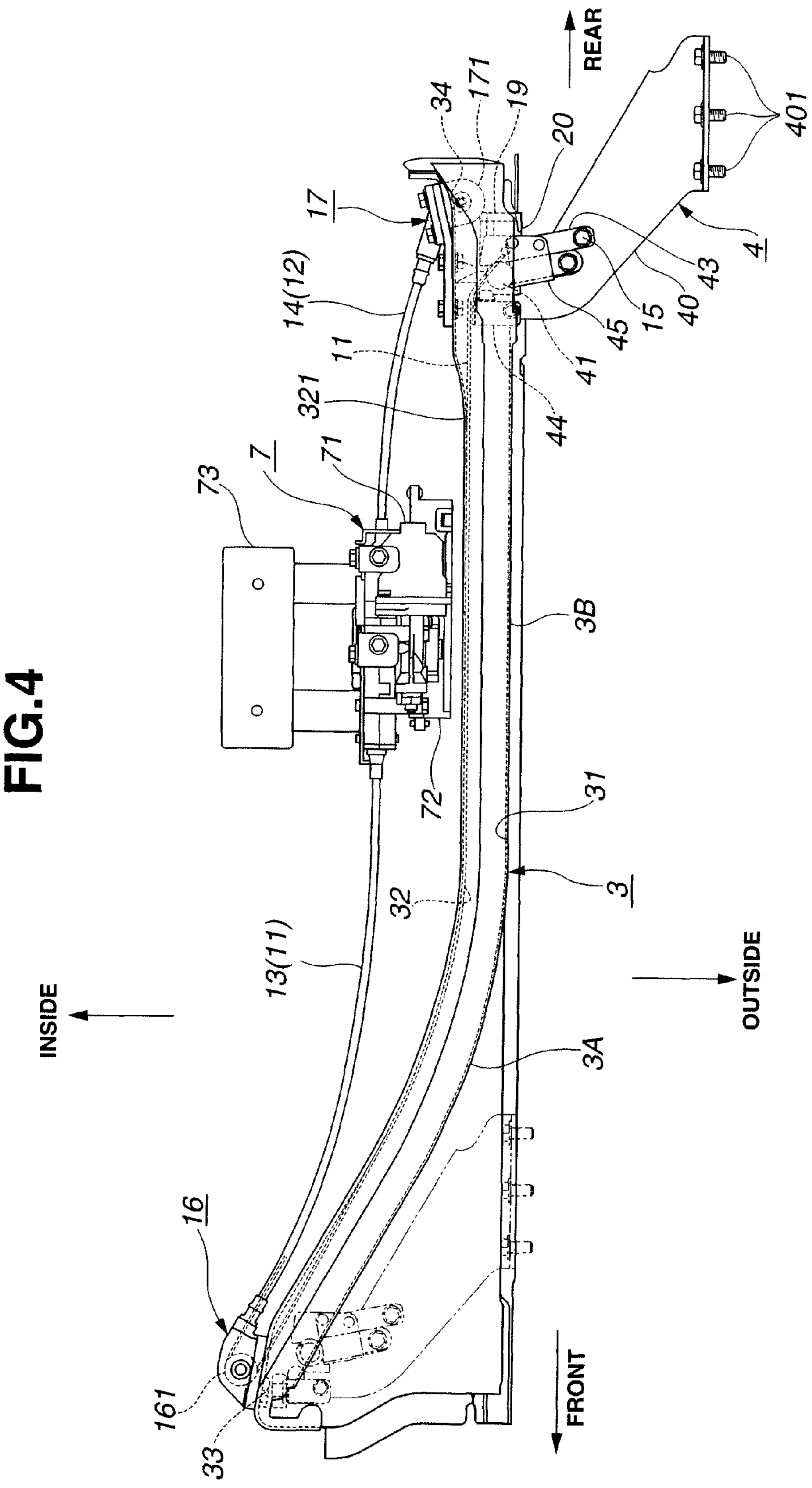
FIG. 4 is a plan view of the slide door opening/closing device of the present invention.

As is seen from FIGS. 1 and 4, the lower guide rail 3 generally comprises a straight rear portion 3B and an inwardly curved front portion 3A, and as is seen from FIGS. 1 and 3, the lower guide rail 3 is of a channel structure having an axially extending slot that faces outside, that is, horizontally outward.

As is best seen from FIG. 3, the lower guide rail 3 comprises a horizontal guide channel portion 31 that constitutes an upper elongate part of the rail 3 and a vertical guide channel portion 32 that constitute a lower elongate part of the rail 3. These horizontal and vertical guide channel portions 31 and 32 are integrated.

As is seen from FIGS. 1 and 3, the above-mentioned lower roller bracket 4 secured to the front lower portion of the slide side door 2 projects into the axially extending slot of the lower guide rail 3 in such a manner as will be described in detail hereinafter.

The lower roller bracket 4 comprises a metal base plate 40.

Figure 5:
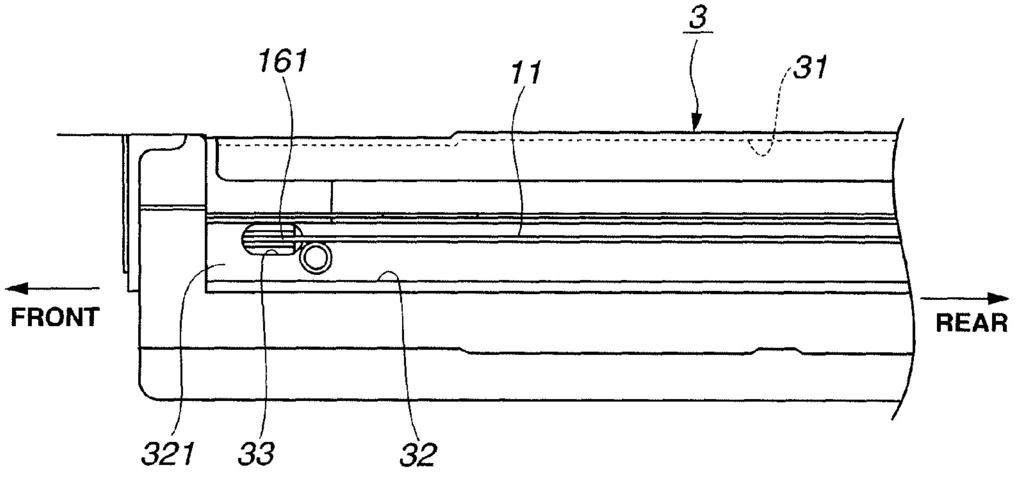
FIG. 5 is a side view of a front portion of a lower guide rail, which is viewed from outside the vehicle.

As is seen from FIG. 5 that is a side view of the front portion of the lower guide rail 3, an inside bottom wall 321 of the vertical guide channel portion 32 is formed at a front part thereof with a front cable slot 33 through which an aftermentioned door closing inner cable 11 passes. The arrangement of the inside side wall 321 is well understood from FIG.

3. The door closing inner cable 11 is wound on a wind/rewind drum (not shown) of the electric actuator unit 7.

Figure 6:
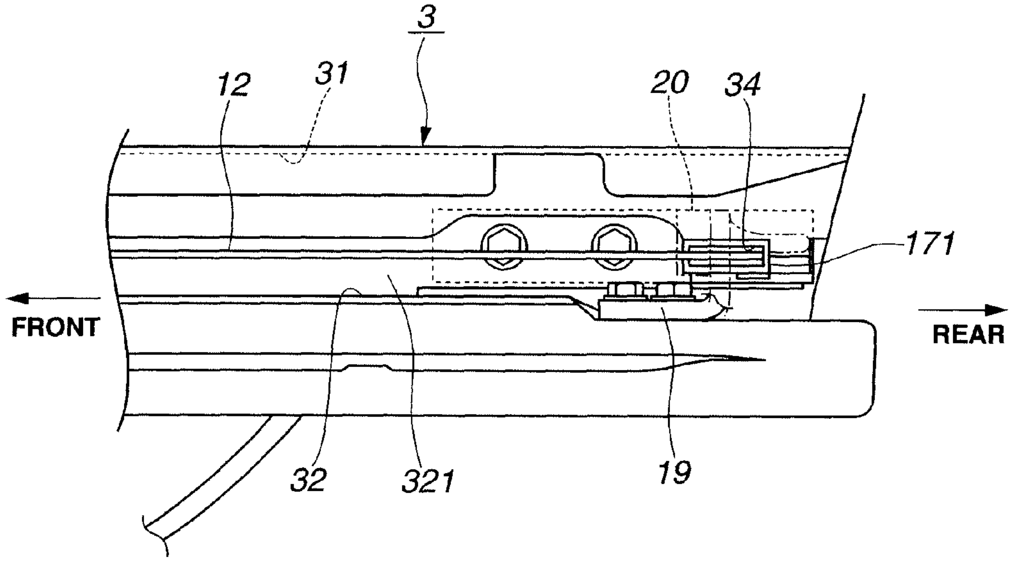
FIG. 6 is a side view of a rear portion of the lower guide rail, which is viewed from outside the vehicle.

As is seen from FIG. 6 that is a side view of the rear portion of the lower guide rail 3, the inside bottom wall 321 of the vertical guide channel portion 32 is formed at a rear part thereof with a rear cable slot 34 through which an after-mentioned door opening inner cable 12 passes. The door opening inner cable 12 is wound on the wind/rewind drum of the electric actuator unit 7.

It is to be noted that in FIG. 1, a part of the door closing inner cable 11 is slidably received in a front outer tube 13, and a part of the door opening inner cable 12 is slidably received in a rear outer tube 14.

Figure 2:
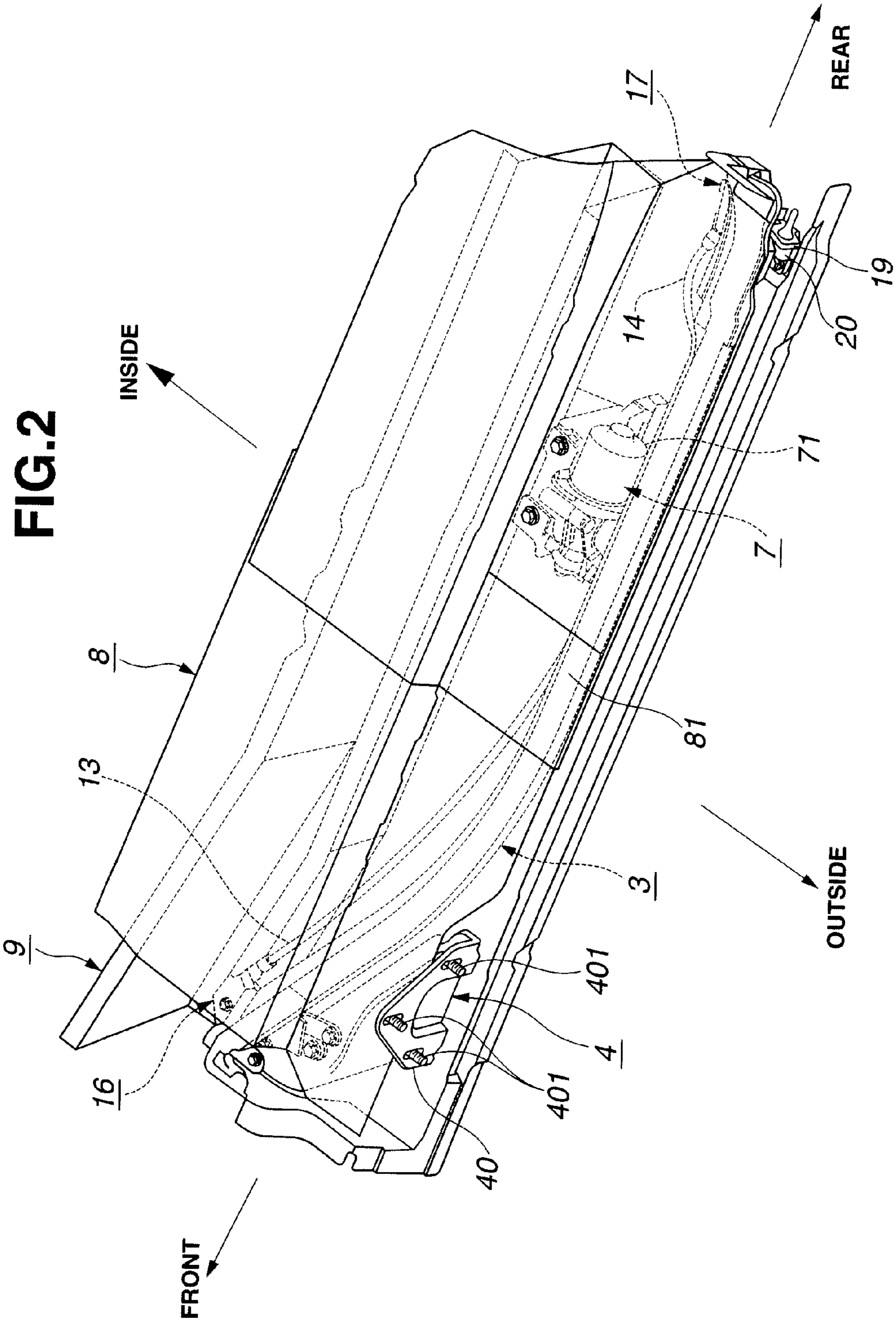
FIG. 2 is an enlarged perspective view of an essential part of the slide door opening/closing device of the present invention, which is viewed from a direction of an arrow "II" of FIG. 1 with a lower roller bracket taking a different position.

As is seen from FIGS. 2 and 4, to the front part of the inside bottom wall 321 where the front cable slot 33 is provided, there is fixed a front cable guide 16 that has an opening merged with the front cable slot 33. The front cable guide 16 houses a pulley 161 by which the door closing inner cable 11 changes its traveling direction. As is seen from FIGS. 4 and 7, the door closing inner cable 11 travels in and through the front outer tube 13, the front cable guide 16, the front cable slot 33 and an interior of the lower guide rail 3.

As is seen from FIGS. 2 and 4, to the rear part of the inside bottom wall 321 where the rear cable slot 34 is provided, there is fixed a rear cable guide 17 that has an opening merged with the rear cable slot 34. The rear cable guide 17 houses a pulley 171 by which the door opening inner cable 12 changes its traveling direction. As is seen from FIGS. 4 and 8, the door opening inner cable 12 travels in and through the rear outer tube 14, the rear cable guide 17, the rear cable slot 34 and the interior of the lower guide rail 3.

As will become apparent as the description proceeds, leading ends of the door closing and opening inner cables 11 and 12 are connected to the inwardly projected part of the lower roller bracket 4 for driving the slide side door 2 in the fore-and-aft direction.

As is shown from FIGS. 2, 4, 6 and 8, particularly FIG. 2, to a rear end of the lower guide rail 3, there is fixed to a stopper plate 19 that has a generally L-shaped cross section as is seen from FIG. 6. As shown in FIG. 2, the stopper plate 19 has at its front surface a cushion member 20 fixed thereto. The cushion member 20 is made of rubber or the like.

That is, when the slide side door 2 comes to the rearmost position, viz., the fully open position, a rear edge of the lower roller bracket 4 is brought into contact with the cushion member 20 of the stopper plate 19. Due to provision of such cushion member 20, stopping of the door 2 is smoothly made.

Figure 7:
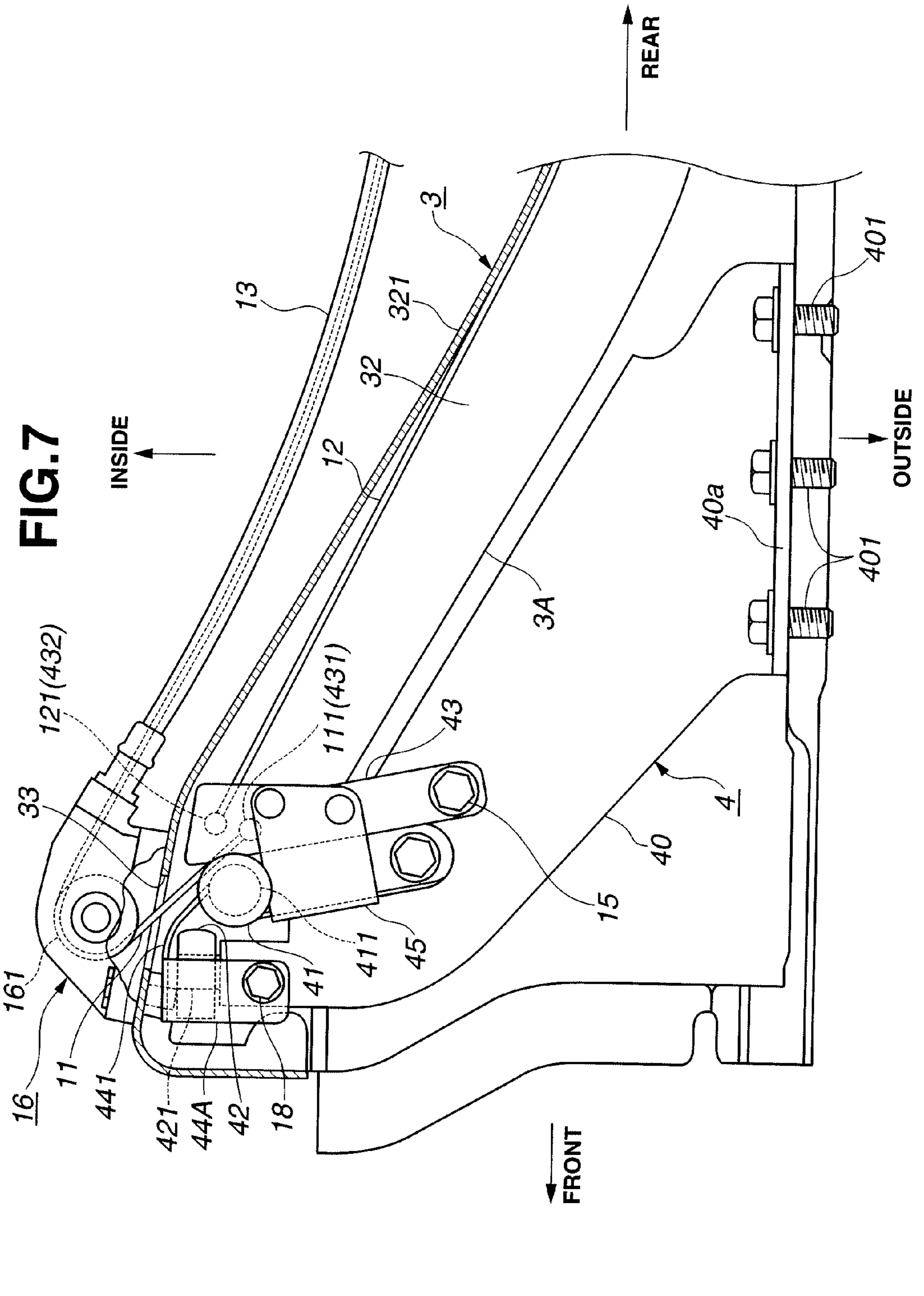
FIG. 7 is an enlarged plan view of a front portion of the slide door opening/closing device of the present invention with a lower guide rail horizontally cut.

As is seen from FIGS. 3 and 7, the lower roller bracket 4 comprises a base plate 40 that has a bent end 40*a* secured to the slide side door 2 through bolts 401, a vertical shaft 44 that is secured to the base plate 40 and extends vertically, a horizontal roller 41 that is rotatably disposed about the vertical shaft 44 and rotatably received in the horizontal guide channel portion 31 of the lower guide rail 3, a horizontal shaft 421 that is secured to an inward bent end 40*b* of the base plate 40 and extends horizontally, and a vertical roller 42 that is rotatably disposed about the horizontal shaft 421 and rotatably received in the vertical guide channel portion 32 of the lower guide rail 3.

As is best shown in FIG. 7, the lower roller bracket 4 further comprises a cable connecting bracket 43 that is secured to the base plate 40 through a bolt 15 and has cylindrical cable ends 111 and 121 of the above-mentioned door closing and opening inner cables 11 and 12 fixed thereto, and a guide plate 44A (see FIGS. 7 and 9) that is fixed to the inner end of the base plate 40 for temporarily guiding the door closing inner cable 11. That is, under movement of the door closing inner cable 11, a part of the cable 11 is contactable with the guide plate 44A.

Figure 8:
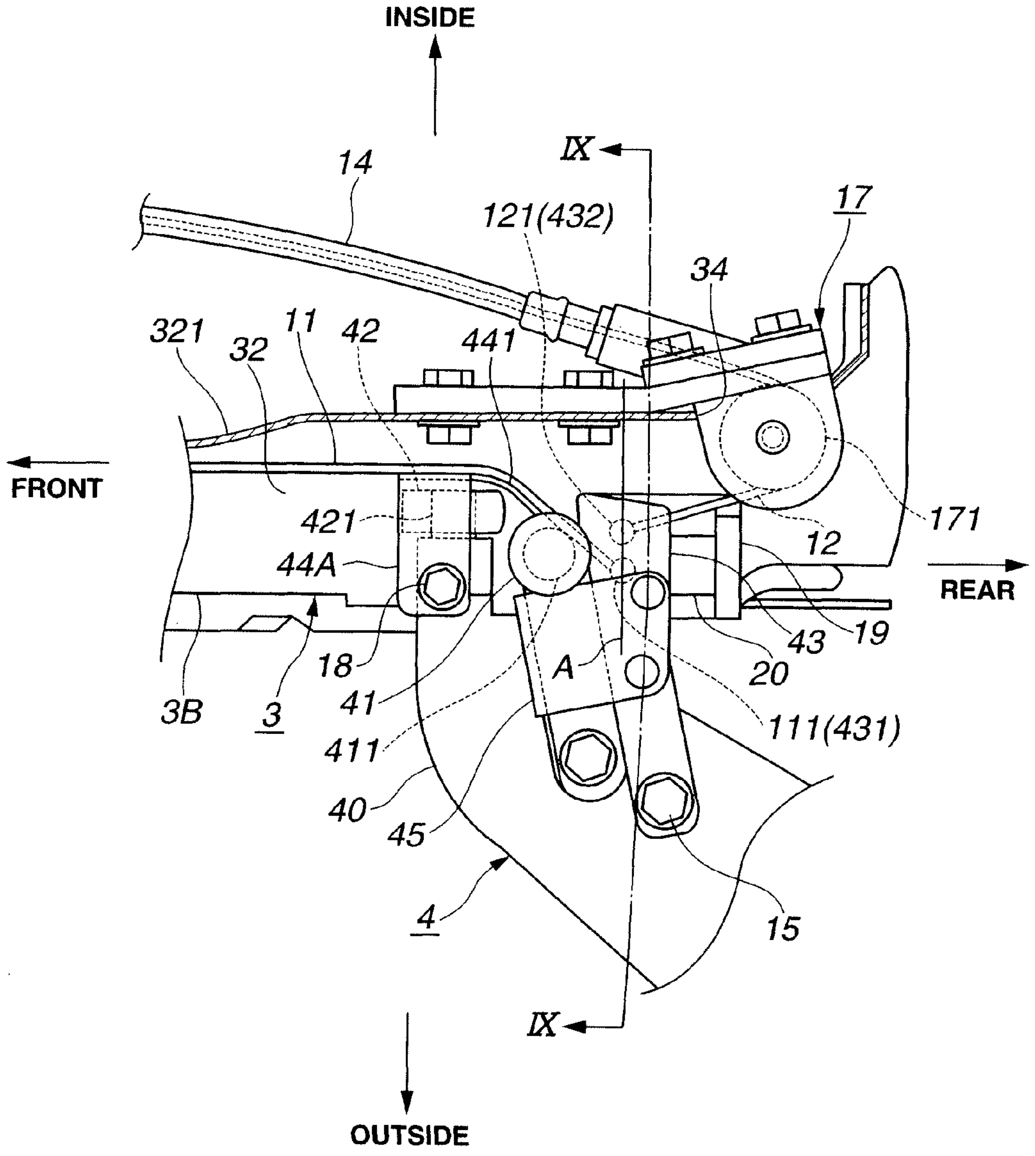
FIG. 8 is an enlarged plan view of a rear portion of the slide door opening/closing device of the present invention with the lower guide rail horizontally cut.

That is, when the slide side door 2 is at the fully closed position, the slide door opening/closing device assumes a condition or position shown in FIGS. 2 and 7, and when the slide side door 2 comes to the fully open position, the slide door opening/closing device assumes a condition or position shown in FIGS. 4 and 8.

As is seen from FIGS. 7 and 8 that are plan views of the slide door opening/closing device, the horizontal roller 41 is positioned behind the vertical roller 42, and as is seen from FIG. 3, the horizontal roller 41 is positioned above the vertical roller 42.

As shown in FIG. 7, the cable connecting bracket 43 is positioned behind the horizontal roller 41. For securing the bracket 43 to the base plate 40, an upper holding plate 45 is also used in addition to the above-mentioned bolt 15.

The cable connecting bracket 43 is formed at a lower surface with cylindrical holding recesses 431 and 432 into which the cylindrical cable ends 111 and 121 of the door closing and opening cables 11 and 12 are rotatably and respectively received.

As is understood from FIGS. 7 and 8, the cylindrical holding recesses 431 and 432 are provided at a position that is more outside than the vertical roller 42 and behind the horizontal roller 41. As will be understood FIG. 9 that is a sectional view taken along the line "IX-IX" of FIG. 8, the cylindrical holding recesses 431 and 432 have a vertical position that is generally the same as that of the horizontal shaft 421 of the vertical roller 42.

Furthermore, as is seen from FIGS. 7 and 8, the cylindrical holding recess 431 for the door closing inner cable 11 is positioned more outside than the other cylindrical holding recess 432 for the door opening inner cable 12.

With the above-mentioned arrangement, the cable ends 111 and 121 for the respective door closing and opening inner cables 11 and 12 are placed in different positions in a lateral direction of the motor vehicle.

More specifically, as is seen from FIGS. 1 and 8, when the lower roller bracket 4 is placed at the straight rear portion 3B of the lower guide rail 3, the cable connecting bracket 43 is so oriented that an imaginary line "A" passing through respective centers of the cylindrical holding recesses 431 and 432 is substantially perpendicular to the fore-and-aft direction in which the slide side door 2 slides.

Figure 9:
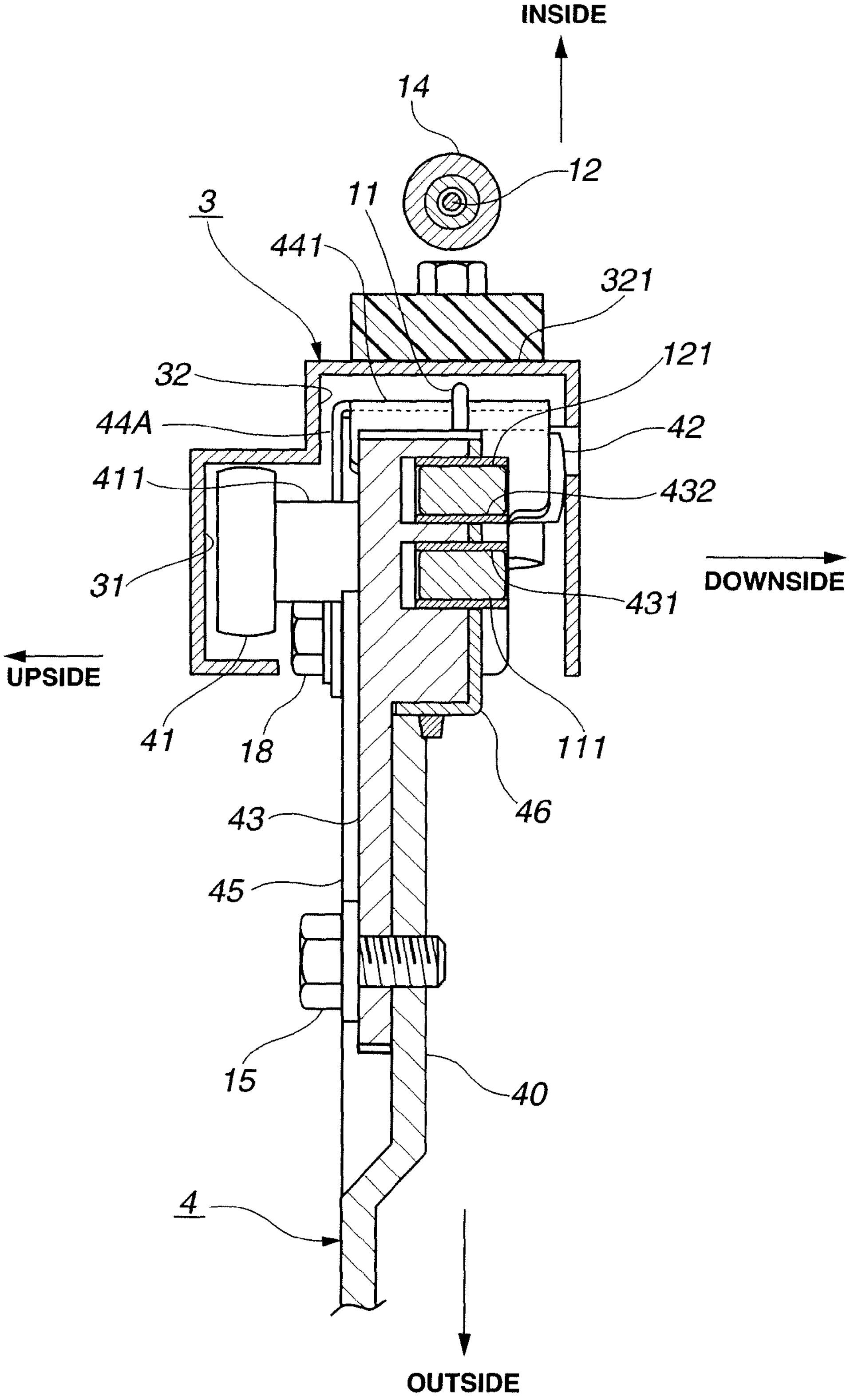
FIG. 9 is an enlarged sectional view taken along the line "IX-IX" of FIG. 8.

As is seen from FIG. 9, the cylindrical cable ends 111 and 121 put in the respective cylindrical holding recesses 431 and 432 are held by a lower holding plate 46 secured to a lower surface of the cable connecting bracket 43.

As will be understood from FIG. 8, when the slide side door 2 is driven to the fully open position, an edge of the cable connecting bracket 43 just behind the cylindrical holding recesses 431 and 432 is brought into contact with the cushion member 20 of the stopper plate 19 thereby to smoothly stop the door 2 at the fully open position.

As is seen from FIG. 8, for connection of the door closing and opening inner cables 11 and 12 with the lower roller bracket 4, the cylindrical cable ends 111 and 121 are received in the respective cylindrical holding recesses 431 and 432 that are positioned behind the horizontal roller 41 and vertical roller 42. Thus, there is no need of proving the lower roller bracket 4 with a forwardly extending catch portion that catches the cable ends 111 and 121. Accordingly, the work for fitting the two cable ends 111 and 121 into the cylindrical holding recesses 431 and 432 is easily made by only watching the rear area behind the horizontal roller 41. Furthermore, due to no need of providing the forwardly extending catch portion, the size of the lower roller bracket 4, particularly, the length of the lower roller bracket 4 in the fore-and-aft direction can be minimized or at least reduced.

Accordingly, as will be seen from FIG. 7, the lower roller bracket 4 can be moved forward to a position where the vertical roller 42 is placed near or before the front cable guide 16, that is to a position near the front end of the inwardly curved front portion 3A of the lower guide rail 3.

Accordingly, even when the front cable guide 16 is positioned behind the front end of the lower guide rail 3, the slide side door 2 can be assuredly moved to the fully closed position.

Furthermore, due to the connection of the cable ends 111 and 121 with the lower roller bracket 4 having the cable ends 111 and 121 placed outside the vertical roller 42, a cable connecting portion of the lower roller bracket 4 to which the cable ends 111 and 121 are connected is suppressed from projecting inside of the vehicle body as compared with the vertical roller 42, so that interference between the cable connecting portion of the lower roller bracket 4 and the inside bottom wall 321 of the lower guide rail 3 is prevented.

As is seen from FIGS. 7, 8 and 9, the guide plate 44A is fixed to an upper surface of the base plate 40 through a bolt 18. Furthermore, as is seen from these drawings, the guide plate 44A has at an end thereof a guide portion 441 that covers a side surface of the vertical roller 42 while extending obliquely toward cylindrical holding recess 431 of the cable end 111.

The guide portion 441 guides the door closing inner cable 11 in a manner to prevent the inner cable 11 from contacting the vertical roller 42. Actually, the door closing cable 11 runs through an elongate path defined along and between the vertical roller 42 and the inside bottom wall 321 of the vertical guide channel portion 32. Due to provision of such guide portion 441, undesired contact of the inner cable 11 with the vertical roller 42 is suppressed even when the cable end 111 of the door closing inner cable 11 is connected to the lower roller bracket 4 at the outside position behind the vertical roller 42.

Figure 10:
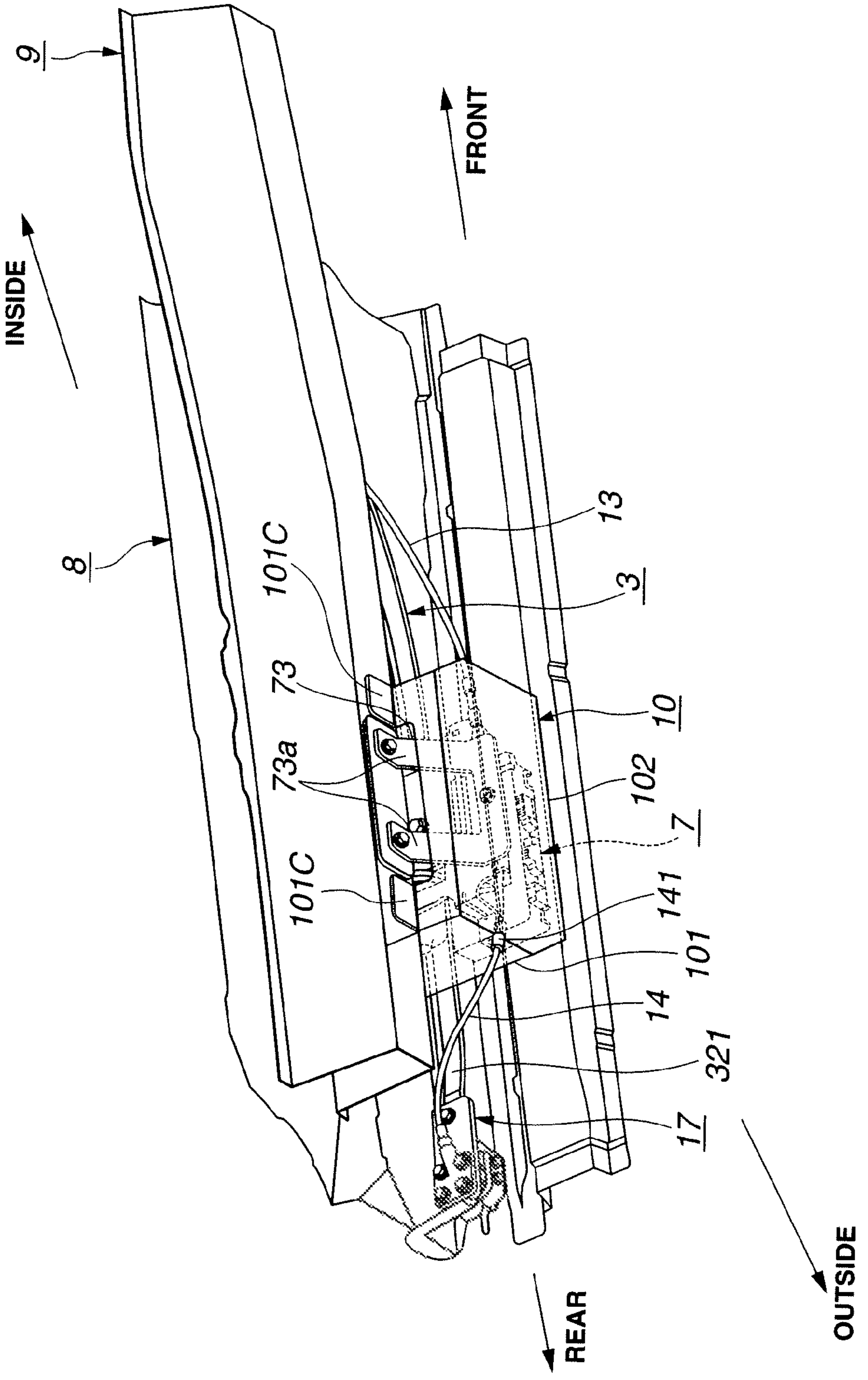
FIG. 10 is a perspective view of an underside area of the motor vehicle to which an electric actuator unit is mounted.

In the following, the detail of the electric actuator unit 7 will be described with the aid of FIGS. 10 and 11. FIG. 10 is a view of an underside area of the motor vehicle to which the electric actuator unit 7 is mounted, and FIG. 11 is a view similar to FIG. 10, but depicting the steps for assembling the slide door opening/closing device of the present invention.

Figure 11:
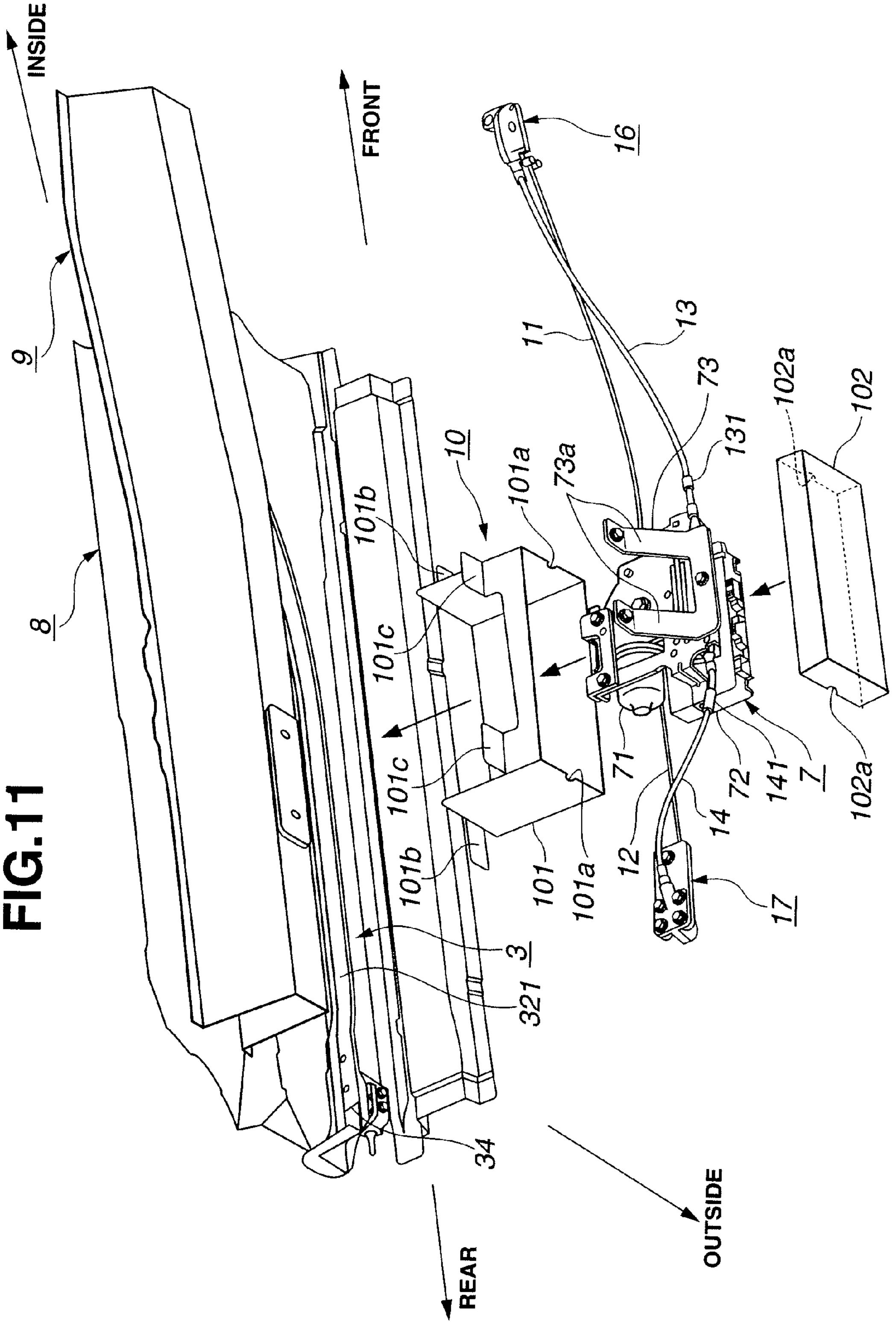
FIG. 11 is a view similar to FIG. 10, but showing steps for assembling the slide door opening/closing device of the present invention.

As is best shown in FIG. 11, the electric actuator unit 7 generally comprises a reversible electric motor 71, a speed reduction gear (no numeral) that is connected to the motor 71 to output a rotation whose speed is lower than that of the motor 71, a wind/rewind drum (not shown) that is driven by the reduction gear for winding and/or rewinding the door closing and opening inner cables 11 and 12, and a gear case 72 houses therein the wind/rewind drum.

The electric actuator unit 7 is fixed to the reinforcing side frame 9 through a bracket 73 that is connected to the electric motor 71 and a side surface of the gear case 72. As is seen from FIG. 10, the electric actuator unit 7 is longitudinally mounted on the side frame 9.

As will be imagined from FIG. 11, leading portions of the door closing and opening inner cables 11 and 12 are wound on the wind/rewind drum, but the winding directions of such leading portions are opposite to each other.

As will be understood from FIG. 4, the door closing inner cable 11 extends forward from the drum in the gear case 72, and travels in the front outer tube 13 and changes its traveling direction at the front cable guide 16 and enters the lower guide rail 3 from the front cable slot 33. The door closing inner cable 11 thus received in the lower guide rail 3 has the cable end 111 put in the cylindrical holding recess 431.

Like the door closing inner cable 11, the door opening inner cable 12 extends rearward from the drum in the gear case 72, and travels in the rear outer tube 14 and changes its traveling direction at the rear cable guide 17 and enters the lower guide rail 3 from the rear cable slot 34. The door opening inner cable 12 thus received in the lower guide rail 3 has the cable end 121 put in the cylindrical holding recess 432.

As is mentioned hereinabove, between the gear case 72 and the front cable guide 16, there extends the front outer tube 13 for slidably receiving therein the door closing inner cable 11.

Between the gear case 72 and the rear cable guide 17, there extends the rear outer tube 14 for slidably receiving therein the door opening inner cable 12.

As will be understood from FIGS. 3, 10 and 11, a rectangular parallelepiped watertight case 10 is fixed to the lower surface of the floor panel 8 and encloses therein the electric actuator unit 7 while defining a zone for the lower guide rail 3 and another zone for the electric actuator unit 7. Accordingly, due to provision of the watertight case 10, rainwater, dust and the like, that would enter through a clearance between the floor panel 8 and the lower guide rail 3, are suppressed from entering the zone for the electric actuator unit 7.

As is best shown in FIG. 11, the rectangular parallelepiped watertight case 10 is so sized as to cover only the electric actuator unit 7 and comprises a pair of parts which are a rectangular parallelepiped upper case part 101 that has upper and lower portions both opened and a rectangular parallelepiped lower case part 102 that is detachably connected to the lower portion of the upper case part 101 in a manner to close the opening of the lower portion of the upper case part 101. The upper case part 101 is secured to the lower surface of the floor panel 8 in such a manner as will be described in the following.

As is seen from FIG. 11, front and rear walls of the upper case part 101 have at leading edges thereof semicircular cuts 101*a* and 101*a*, and front and rear walls of the lower case part 102 have at leading edges thereof semicircular cuts 102*a* and 102*a*. As is seen from FIG. 10, when the upper and lower case parts 101 and 102 are coupled, the two pairs of cuts 101*a* and 102*a* are merged to constitute two circular openings through which the front and rear outer tubes 13 and 14 pass respectively.

As is seen from FIG. 11, the front and rear walls of the upper cover 101 have at base edges thereof respective lugs 101*b* and 101*b*. Furthermore, an inside short wall of the upper case part 101 has at a leading edge thereof two lugs 101*c* and 101*c*.

In the following, steps for mounting the electric actuator unit 7 to the lower surface of the floor panel 8 will be described with the aid of FIGS. 10 and 11.

First, as will be understood from FIG. 11, the upper case part 101 is fixed to the lower surface of the floor panel 8. For this fixing, the lugs 101*b* and 101*b* of the upper case part 101 are secured to the lower surface of the floor panel 8 and as is seen from FIG. 10, the lugs 101*c* and 101*c* of the upper case part 101 are secured to a bottom wall of the elongate reinforcing side frame 9.

Then, as is seen from FIG. 11, the electric actuator unit 7 is put into the fixed upper case part 101 from the lower opening of the upper case part 101 and then fixed in the upper case part 101 by means of the bracket 73.

That is, as will be understood from FIGS. 10 and 11, upon insertion of the unit 7 into the upper case part 101, two arms

73*a* and 73*a* of the bracket 73 fixed to the gear case 72 are put out from the upper case part 101 and as is seen from FIG. 10, the two arms 73*a* and 73*a* are bolted to the bottom wall of the side frame 9. Upon this, the front and rear outer tubes 13 and 14 are half put in the semicircular cuts 101*a* and 101*a*.

Then, as is seen from FIG. 11, the lower case part 102 is fixed to the lower portion of the upper case part 101 to close the opening of the lower portion of the upper cover 101. With this, the front and rear outer tubes 13 and 14 are tightly received in the circular openings each including the semicircular cuts 101*a* and 102*a* which are merged. Thus, the tubes 13 and 14 from the electric actuator unit 7 can be readily led to the outside of the watertight case 10.

As is seen from FIG. 11, for assuring the watertight sealing between each of the outer tubes 13 and 14 and the watertight case 10, each outer tube 13 or 14 has, at a portion thereof put in the circular opening (101*a*, 102*a*), a sealing member 131 or 141 disposed thereabout. The sealing member 131 or 141 is made of sponge, rubber or the like.

In the following, operation of the slide door opening/closing device of the present invention will be described with reference to the drawings.

For ease of understanding, the description will be commenced with respect to the fully open position "Y" of the slide side door 2 as shown in FIG. 1.

Under this condition, the door opening/closing device assumes such a condition as is shown in FIGS. 4 and 8. That is, as is best seen from FIG. 8, the lower roller bracket 4 takes the rear end of straight rear portion 3B of the lower guide rail 3 and the rear end of the cable connecting bracket 43 is in contact with the cushion member 20 of the stopper plate 19. Furthermore, the door closing inner cable 11 is in contact with the guide portion 441 of the guide plate 44A while avoiding contact with the vertical roller 42.

When now a control switch (not shown) provided near a driver's seat is turned in a direction to close the slide side door 2, the electric motor 71 of the electric actuator unit 7 is energized to run in one direction. Upon this, the wind/rewind drum (not shown) of the unit 7 is turned in a direction to wind up the door closing inner cable 11 while releasing the door opening inner cable 12. Due to this operation, the lower roller bracket 4 is pulled forward along the straight rear portion 3B of the rail 3 by the door closing inner cable 11. During this, the slide side door 2 is moved forward and straightly beside the side panel of the vehicle body 1.

When, as will be seen from FIG. 1, the lower roller bracket 4 comes to and enters the inwardly curved front portion 3A of the rail 3, the slide side door 2 is gradually shifted inward while moving forward, and finally, the door 2 is brought to the fully closed position "X".

During the forward and inward movement of the slide side door 2, the lower roller bracket 4 is smoothly and effectively moved along the inwardly curved front portion 3A because of the above-mentioned unique positioning of the cable end 111 of the door closing inner cable 11 with respect to the horizontal and vertical rollers 41 and 42. That is, as is understood from FIG. 7, the cable end 111 of the cable 11 is put in the holding recess 431 that is placed behind the horizontal and vertical rollers 41 and 42 and at the outer side of the vehicle body 1.

As is seen from FIG. 7, when the slide side door 2 takes the fully closed position "X", the lower roller bracket 4 takes such a position that the vertical roller 42 is ahead of the front cable guide 16.

Upon arriving at the fully closed position "X", a part of a door latch device (not shown) mounted to the rear end of the slide side door 2 is hit by a striker (not shown) fixed to the vehicle body 1 and thus the door 2 is retained in the fully closed position "X", and at the same time, due to operation of a certain position sensor (not shown), energization of the electric motor 71 stopped.

When then the control switch is turned in the other direction to open the slide side door 2, the electric motor 71 is energized to run in the other direction. Upon this, the wind/rewind drum of the electric actuator unit 7 is turned in the other direction to wind up the door opening inner cable 12 while releasing the door closing inner cable 11. Due to this operation, the lower roller bracket 4 is pulled rearward along the inwardly curved front portion 3A of the guide rail 3 by the door opening inner cable 12. During this, the slide side door 2 is shifted outward while moving rearward toward the straight rear portion 3B of the rail 3. Finally, the door 2 is brought to the above-mentioned fully open position "Y". Upon arriving at the fully open position "Y", energization of the electric motor 71 is stopped due to operation of the position sensor.

Figure 12:
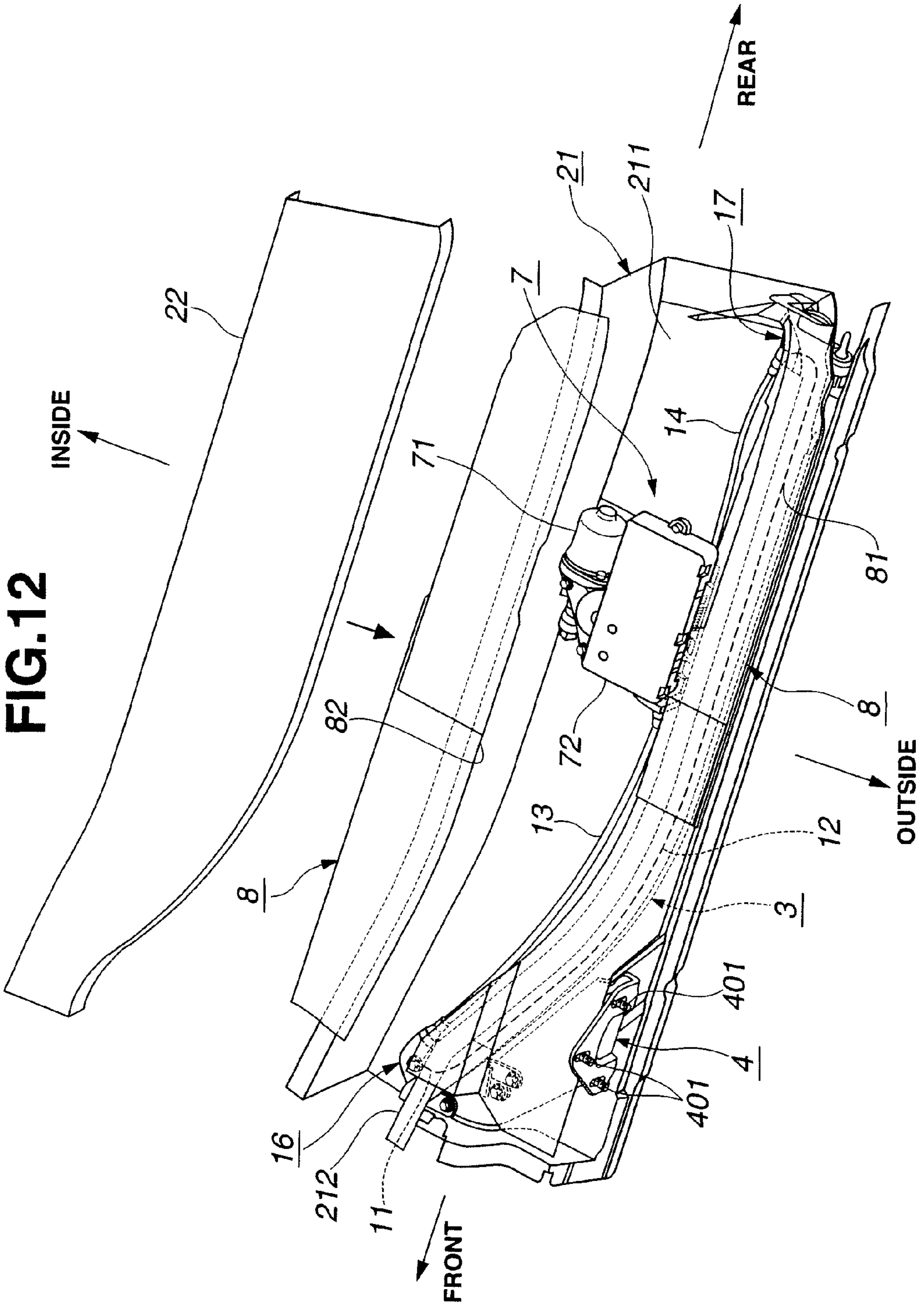
FIG. 12 is a view similar to FIG. 2, but showing a second embodiment) of the side door opening/closing device of the present invention.

In the following, a modification of the present invention will be described with reference to FIGS. 12 and 13. FIG. 12 is a view similar to FIG. 2, but showing the modification, and FIG. 13 is a view similar to FIG. 3, but showing the modification.

In this modification, in place of the above-mentioned rectangular parallelepiped watertight case 10, a watertight housing structure 100 is employed for enclosing therein the electric actuator unit 7.

That is, as is seen from the drawings, the watertight housing structure 100 comprises generally an elongate case 21 that is fixed to the lower surface of the floor panel 8 and arranged between the lower guide rail 3 and the side frame 9, and an elongate cover plate 22 that is detachably put on the elongate case 21 keeping a watertight sealing therebetween. With this, a so-called watertight container is defined by the elongate case 21 and the elongate cover plate 22.

Figure 13:
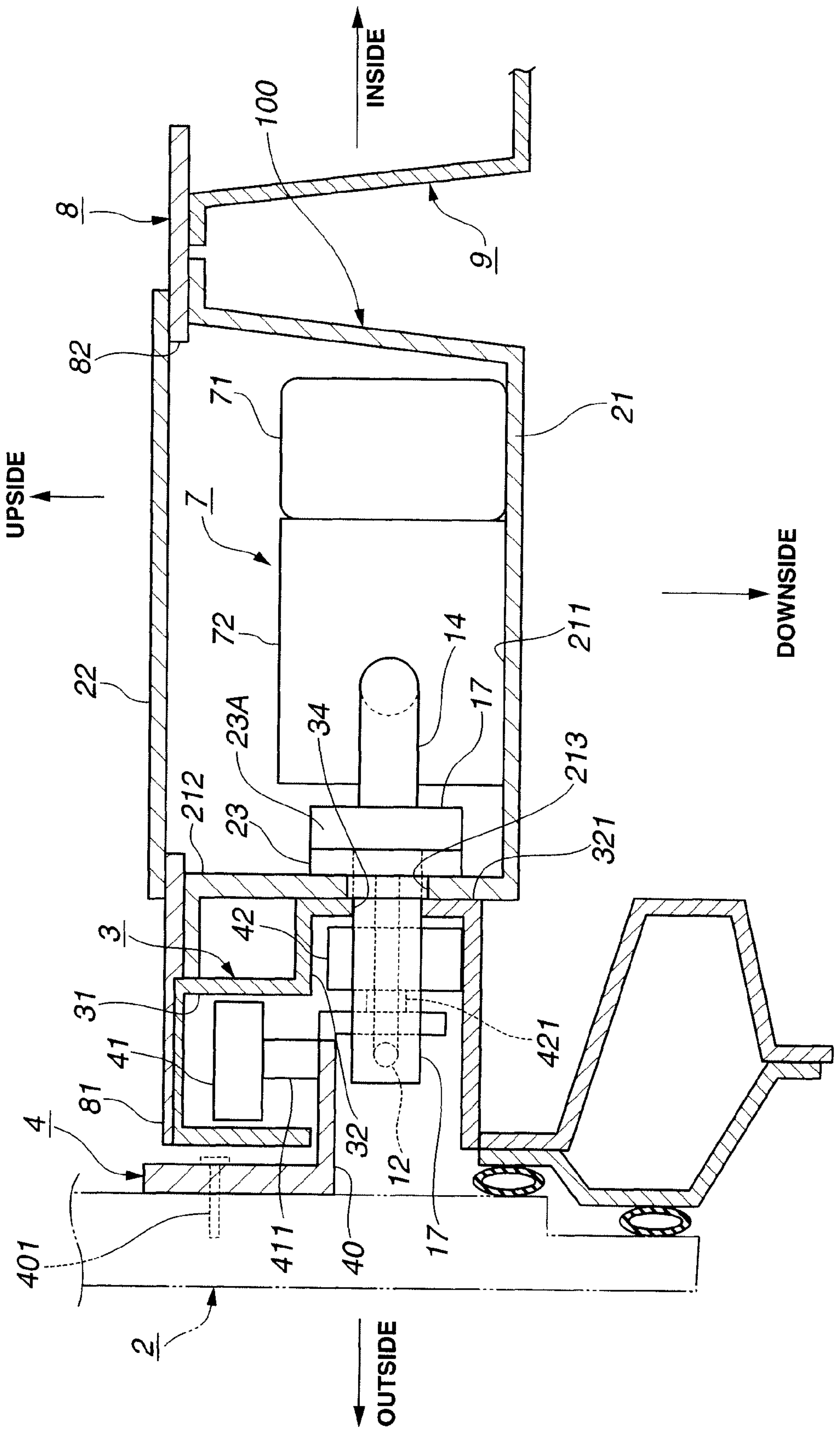
FIG. 13 is a view similar to FIG. 3, but showing the second embodiment.

More specifically, as is seen from FIG. 13, an inside wall of the elongate case 21 serves as one of the inclined walls of the side frame 9, and an outside wall 212 of the elongate case 21 is in contact with a vertical wall 321 of the vertical guide channel portion 32. The outside wall 212 has an upper flange (no numeral) abutting against an inside wall of the horizontal guide channel portion 31, as shown.

The elongate cover plate 22 covers an opening 82 of the floor panel 8 that is exposed to the interior of the elongate case 21. Although not shown in the drawings, a sealing member is tightly received between the cover plate 22 and a peripheral portion of the opening 82 and bolts are used for fixing the cover plate 22 to the floor panel 8.

The electric motor 71 and the gear case 72 are mounted on a base wall 211 of the elongate case 21.

As is seen from FIGS. 12 and 13, the rear outer tube 14 extending from the gear case 72 is led to the rear cable guide 17 through a circular opening 213 formed in the outside wall 212 of the elongate case 21. The circular opening 213 is connected with the rear cable slot 34 of the vertical guide channel portion 32. For sealing an annular clearance defined between the rear outer tube 14 and an inner wall of the circular opening 213, there is employed a circular seal member 23 that is pressed against the outside wall 212 by a press plate 23A tightly disposed on the rear outer tube 14.

Although not well shown in the drawings, the front outer tube 13 extending from the gear case 72 is led to the front cable guide 16 through a circular opening formed in the outside wall 212 of the elongate case 21. The circular opening is connected with the front cable slot 33 (see FIG. 5) of the vertical guide channel portion 32. For sealing an annular clearance defined between the front outer tube 13 and an inner wall of the circular opening of the outside all 212, there is employed a circular seal member like the above-mentioned seal member 23, which is pressed against the outside wall 212 by a press plate like the above-mentioned press plate 23A, which is tightly disposed on the front outer tube 13.

With the above-mentioned construction, the interior of the elongate case 21 is watertightly isolated and thus the electric actuator unit 7 housed in the elongate case 21 is protected from rain water, dust and the like.

As will be seen from FIG. 12, the door closing and opening inner cables 11 and 12 from the respective front and rear outer tubes 13 and 14 are forced to change their traveling direction by the front and rear cable guides 16 and 17 and led into the interior of the lower guide rail 3.

As has been mentioned hereinabove, the floor panel 8 is formed, at a portion thereof where the elongate case 21 is provided, with the opening 82 that is exposed to the interior of the elongate case 21. Due to provision of such opening 82, the manual work for setting the electric actuator unit 7 and its associated parts, such as the front and rear outer tubes 13 and 14 through which parts of the door closing and opening inner cables 11 and 12 pass, onto the base wall 211 of the elongate case 21 is easily achieved. Of course, the opening 82 is watertightly closed by the elongate cover plate 22 after the parts setting to the elongate case 21 is finished.

The entire contents of Japanese Patent Application 2007-289583 filed Nov. 7, 2007 are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. A slide door opening/closing device of a motor vehicle, comprising:

- a lower guide rail mounted to a lower surface of a vehicle floor panel;
- a lower roller bracket fixed to a slide door, the lower roller bracket being guided by the lower guide rail when the slide door is moved between open and closed positions;
- an electric actuator unit mounted to the lower surface of the floor panel;
- a watertight cover mounted to the lower surface of the floor panel in a manner to cover the electric actuator unit such that a space where the lower guide rail is present is separated from a space where the electric actuator unit is present;
- cables passing through cable passing openings formed in the watertight cover and running in the lower guide rail, the cables being driven by the electric actuator unit and having respective ends fixed to the lower roller bracket, such that, upon energization of the electric actuator unit, the lower roller bracket is moved for the movement of the slide door between the open and closed positions; and
- sealing members that hermetically close the cable passing openings.

2. A slide door opening/closing device of a motor vehicle, comprising:

- a lower guide rail mounted to a lower surface of a vehicle floor panel;
- front and rear cable guides provided on front and rear ends of the lower guide rail, respectively;
- a lower roller bracket fixed to a slide door, the lower roller bracket being guided by the lower guide rail when the slide door is moved between open and closed positions;
- an electric actuator unit mounted to the lower surface of the floor panel, the electric actuator unit including a cable wind/rewind drum;
- a watertight cover mounted to the lower surface of the floor panel in a manner to cover the electric actuator unit, the watertight cover having front and rear cable passing openings formed therethrough;
- a first inner cable that passes through the front cable passing opening and is guided by the front cable guide, the first inner cable having one end portion wound on the wind/rewind drum and the other end portion fixed to the lower roller bracket;
- a second inner cable that passes through the rear cable passing opening and is guided by the rear cable guide, the second inner cable having one end portion wound on the wind/rewind drum and the other end portion fixed to the lower roller bracket; and
- sealing members that hermetically close the front and rear cable passing openings.

3. A slide door opening/closing device as claimed in claim 2, further comprising:

- a first outer tube that extends between the front cable guide and the electric actuator unit for receiving therein the first inner cable; and
- a second outer tube that extends between the rear cable guide and the electric actuator unit for receiving therein the second inner cable.

4. A slide door opening/closing device as claimed in claim 3, in which the watertight cover is a rectangular parallelepiped case that is sized to contain the electric actuator unit.

5. A slide door opening/closing device as claimed in claim 3, in which the watertight cover is so sized as to contain the electric actuator unit and the first and second outer tubes.

6. A slide door opening/closing device as claimed in claim 4, in which the watertight cover comprises:

- an upper case part fixed to the lower surface of the floor panel; and
- a lower case part detachably connected to the upper case part to define an isolated space for receiving the electric actuator unit.

7. A slide door opening/closing device as claimed in claim 5, in which the watertight cover comprises:

- an elongate case that is fixed to the lower surface of the floor panel, the elongate case having an open upper part; and
- an elongate cover plate that is detachably put on the open upper part of the elongate case in a manner to keep a watertight sealing therebetween.

8. A slide door opening/closing device as claimed in claim 7, in which the elongate cover plate is arranged to constitute a part of the floor panel.

9. A slide door opening/closing device as claimed in claim 7, in which the elongate case constitutes a part of a reinforcing side frame fixed to the floor panel.

10. A slide door opening/closing device as claimed in claim 2, in which each of the sealing members is circular and watertightly put on their respective cable passing opening.

11. A slide door opening/closing device as claimed in claim 2, in which the electric actuator unit is arranged between the lower guide rail and a reinforcing side frame that is provided on the lower surface of the floor panel at a position inside the lower guide rail.

12. A slide door opening/closing device as claimed in claim 2, in which the lower guide rail comprises a horizontal guide channel portion that constitutes an upper elongate part of the lower guide rail; and a vertical guide channel portion that constitutes a lower elongate part of the lower guide rail and is integral with the horizontal guide channel portion, and in which the lower roller bracket has a horizontal roller operatively received in the horizontal guide channel portion and a vertical roller operatively received in the vertical guide channel portion.

13. A slide door opening/closing device as claimed in claim 2, in which the lower guide rail is mounted to a side portion of the floor panel.

14. A slide door opening/closing device of a motor vehicle, comprising:

- a lower guide rail mounted to a lower surface of a vehicle floor panel, the lower guide rail including a horizontal guide channel portion and a vertical guide channel portion;
- front and rear cable guides provided on front and rear end portions of the lower guide rail, respectively;
- a lower roller bracket fixed to a slide door, the lower roller bracket having a horizontal roller operatively received in the horizontal guide channel portion and a vertical roller operatively received in the vertical guide channel portion;
- an electric actuator unit mounted to the lower surface of the floor panel, the electric actuator unit including a cable wind/rewind drum;
- a watertight cover mounted to the lower surface of the floor panel in a manner to cover the electric actuator unit, the watertight cover having front and rear cable passing openings formed therethrough;
- a first inner cable that passes through the front cable passing opening and is guided by the front cable guide, the first inner cable having one end portion wound on the wind/rewind drum and the other end portion fixed to the lower roller bracket;
- a second inner cable that passes through the rear cable passing opening and is guided by the rear cable guide, the second inner cable having one end portion wound on the wind/rewind drum and the other end portion fixed to the lower roller bracket; and
- sealing members that hermetically close the front and rear cable passing openings.

15. A slide door opening/closing device for a motor vehicle, comprising:

- a lower guide rail configured to be mounted to a lower surface of a vehicle floor panel;
- a lower roller bracket configured to be fixed to a slide door, wherein the lower roller bracket is configured to be guided by the lower guide rail when the slide door is moved between open and closed positions;
- an electric actuator unit configured to be mounted to the lower surface of the floor panel;
- a watertight cover configured to be mounted to the lower surface of the floor panel in a manner to cover the electric actuator unit such that a space where the lower guide rail is present is separated from a space where the electric actuator unit is present;
- cables passing through cable passing openings formed in the watertight cover and running in the lower guide rail, wherein the cables have respective ends fixed to the lower roller bracket, wherein the cables are configured to be driven by the electric actuator unit such that, upon energization of the electric actuator unit, the lower roller bracket is moved for the movement of the slide door between the open and closed positions; and
- sealing members that hermetically close the cable passing openings.

16. A slide door opening/closing device for a motor vehicle, comprising:

- a lower guide rail configured to be mounted to a lower surface of a vehicle floor panel;
- front and rear cable guides provided on front and rear ends of the lower guide rail, respectively;
- a lower roller bracket configured to be fixed to a slide door;
- an electric actuator unit configured to be mounted to the lower surface of the floor panel, wherein the electric actuator unit comprises a cable wind/rewind drum;
- a watertight cover configured to be mounted to the lower surface of the floor panel such that the electric actuator unit is covered, wherein the watertight cover comprises front and rear cable passing openings formed therethrough;
- a first inner cable that passes through the front cable passing opening and is guided by the front cable guide, wherein the first inner cable comprises one end portion wound on the wind/rewind drum and another end portion fixed to the lower roller bracket;
- a second inner cable that passes through the rear cable passing opening and is guided by the rear cable guide, wherein the second inner cable comprises one end portion wound on the wind/rewind drum and another end portion fixed to the lower roller bracket; and
- sealing members that hermetically close the front and rear cable passing openings.

17. A slide door opening/closing device as claimed in claim 16, wherein the lower roller bracket is configured to be guided by the lower guide rail when the slide door is moved between open and closed positions.

18. A slide door opening/closing device as claimed in claim 16, wherein the lower guide rail comprises a horizontal guide channel portion and a vertical guide channel portion, and wherein the lower roller bracket comprises a horizontal roller operatively received in the horizontal guide channel portion and a vertical roller operatively received in the vertical guide channel portion.

* * * * *